United States Patent [19]

Parker et al.

[11] Patent Number: 4,589,082
[45] Date of Patent: May 13, 1986

[54] NUCLEAR FUEL ROD STRAIGHTNESS MEASURING SYSTEM AND METHOD

[75] Inventors: Merle A. Parker; Hassan J. Ahmed, both of Columbia, S.C.

[73] Assignee: Westinghouse Electric Corp., Pittsburgh, Pa.

[21] Appl. No.: 458,407

[22] Filed: Jan. 17, 1983

[51] Int. Cl.$^4$ .................................................. G01B 5/20
[52] U.S. Cl. ............................... 364/561; 33/178 E; 356/358
[58] Field of Search .............. 364/556, 561, 564, 563, 364/562; 33/178 E, 174 L, 174 R, 174 PC, 143 L, 180 R, 181 R, 185 R; 356/357, 358, 384–387

[56] References Cited

U.S. PATENT DOCUMENTS

| | | | |
|---|---|---|---|
| 3,812,376 | 5/1974 | Takeyama et al. | 356/357 X |
| 3,826,576 | 7/1974 | Stewart | 364/384 X |
| 4,122,607 | 12/1978 | Hopf | 364/560 X |
| 4,141,149 | 2/1979 | George et al. | 33/178 E |
| 4,184,263 | 1/1980 | Tatsumi et al. | 364/560 X |
| 4,226,536 | 10/1980 | Dreyfus et al. | 356/376 |
| 4,248,532 | 2/1981 | Nosler | 356/384 X |
| 4,271,477 | 6/1981 | Williams | 364/560 X |
| 4,365,301 | 12/1982 | Arnold et al. | 364/560 X |
| 4,375,921 | 3/1983 | Morander | 364/560 X |
| 4,397,343 | 8/1983 | Fields | 356/384 X |
| 4,417,816 | 11/1983 | Kindl et al. | 356/357 |

FOREIGN PATENT DOCUMENTS

| | | |
|---|---|---|
| 1135471 | 12/1968 | United Kingdom . |
| 1308553 | 2/1973 | United Kingdom . |
| 1322844 | 7/1973 | United Kingdom . |
| 1383320 | 2/1975 | United Kingdom . |

Primary Examiner—Edward J. Wise
Attorney, Agent, or Firm—D. E. Erickson

[57] ABSTRACT

A rod straightness measuring system and method. A rod, such as a nuclear fuel rod, is supported and rotated in such a manner that if the rod were straight, it would be rotated about its longitudinal axis and remain straight without transverse translational motion, and in such a manner that if the rod were cambered, it would remain so cambered while supported and rotated. A multiplicity of separated and fixed range finders are placed apart from and directed towards the rod so that they would be directed perpendicular to a straight rod's longitudinal axis. The range finders measure the distance to the rotating rod. Differences in maximum and minimum measurements for each range finder indicate the degree of straightness of the rod. In a preferred system and method, the range finders are placed at known distances from a straight rod, and differences in distance measurements from the known distances for each range finder indicate the degree of rod straightness.

13 Claims, 2 Drawing Figures

NUCLEAR FUEL ROD STRAIGHTNESS MEASURING SYSTEM AND METHOD

BACKGROUND OF THE INVENTION

The present invention relates generally to measuring the straightness of a rod and more particularly to a system and method for measuring the straightness of a nuclear fuel rod.

The straightness of nuclear fuel rods is determined in a quality control inspection step after the rods have been loaded with fuel pellets and their ends sealed (such as by welding on end caps) but before the rods have been used in the makeup of a fuel assembly. Rods that do not meet straightness specifications are rejected and salvaged. The use of an out-of-specification fuel rod may well result in improper rod-to-rod spacing in the fuel assembly with a degradation in fuel performance in the reactor, and/or difficulty in fitting together the fuel rods and other components into a fuel assembly.

Conventional techniques for determining fuel rod straightness include manually rolling the rod on a surface table, stopping the rotation at various times, and visually determining (such as with the use of feeler gauges) if any rod is bent.

SUMMARY OF THE INVENTION

Briefly stated, the invention is directed towards a rod straightness measuring system which has a rod support mechanism, a rod rotation apparatus, multiple range finders, and a difference calculating device. The rod support mechanism supports the rod in such a manner that a straight rod would remain straight without transverse translational movement while supported and if rotated about its longitudinal axis, and a cambered rod would remain so cambered while supported and if rotated. The rod rotation apparatus rotates the rod in such a manner that a straight rod would be rotated about its longitudinal axis. The range finders are fixedly-positioned and separated from each other and the rod, are pointed towards the rod, and measure the distance to the rod during the rod's rotation, all in such a manner that each range finder would be pointed perpendicular to the longitudinal axis of, and be located at a known distance from, a straight rod. The difference calculating device calculates, for each of the range finders, the differences in its distance measurements from the known distance of that range finder to a straight rod. These differences show the comparative straightness of the rod (or to state it inversely, the differences express the extent of the camber of the rod).

In another embodiment of the invention, the difference calculating device calculates for each of the range finders the difference between the maximum and minimum of its distance measurements as an indication of rod straightness. In this embodiment, it is not necessary to know the distances at which the range finders are located from a straight rod. This embodiment is otherwise identical with the one previously described in the preceding paragraph.

In a preferred rod straightness measuring system, the rod is a nuclear fuel rod which is supported from underneath in such a manner that a straight rod will be horizontally supported, and which is rotated from one of its ends.

The invention is also directed towards a method for measuring the straightness of a rod. In a first step of a preferred method, support the rod in such a manner that a straight rod would remain straight without transverse translational movement while supported and if rotated about its longitudinal axis, and a cambered rod would remain so cambered while supported and if rotated. Then rotate the rod in such a manner that a straight rod would be rotated while its longitudinal axis. Next measure the distances, while rotating the rod, between the rod and multiple, fixedly-positioned, separated range finders which are separated from the rod and pointed towards the rod all in such a manner that each range finder would be pointed perpendicular to the longitudinal axis of, and be positioned at a known distance from, a straight rod. Now calculate for each of the range finders the differences in its distance measurements from the known distance of that range finder to a straight rod. These differences manifest the quantitative straightness of the rod.

In an optional method of the invention, the steps are identical with those of the method given in the above paragraph, except that it is not necessary that the distances the range finders are disposed from the straight rod be known, and except that in place of the calculating step of the above-described method, there is calculated for each range finder the difference between its maximum and minimum distance measurements as an indication of the straightness of the rod.

BRIEF DESCRIPTION OF THE DRAWINGS

The subject matter of the invention is particularly pointed out and distinctly claimed in the concluding portion of this specification. The invention, however, both as to organization and method of operation, together with further advantages thereof, may best be understood by reference to the following description taken in connection with the accompanying drawings in which:

DETAILED DESCRIPTION OF THE INVENTION

Figure 2:
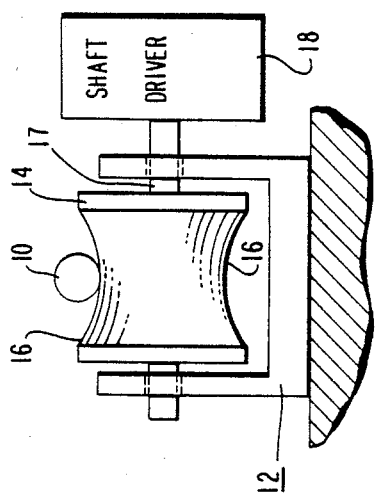
FIG. 2 is a side-elevational schematic view of a portion of FIG. 1 showing the rod support mechanism which includes equipment for moving the rod into and out from the test position.

Reference will now be made in detail to several present preferred embodiments of the invention, an example of which is illustrated in the accompanying drawings. In the drawings, like reference characters designate like or corresponding parts.

Figure 1:
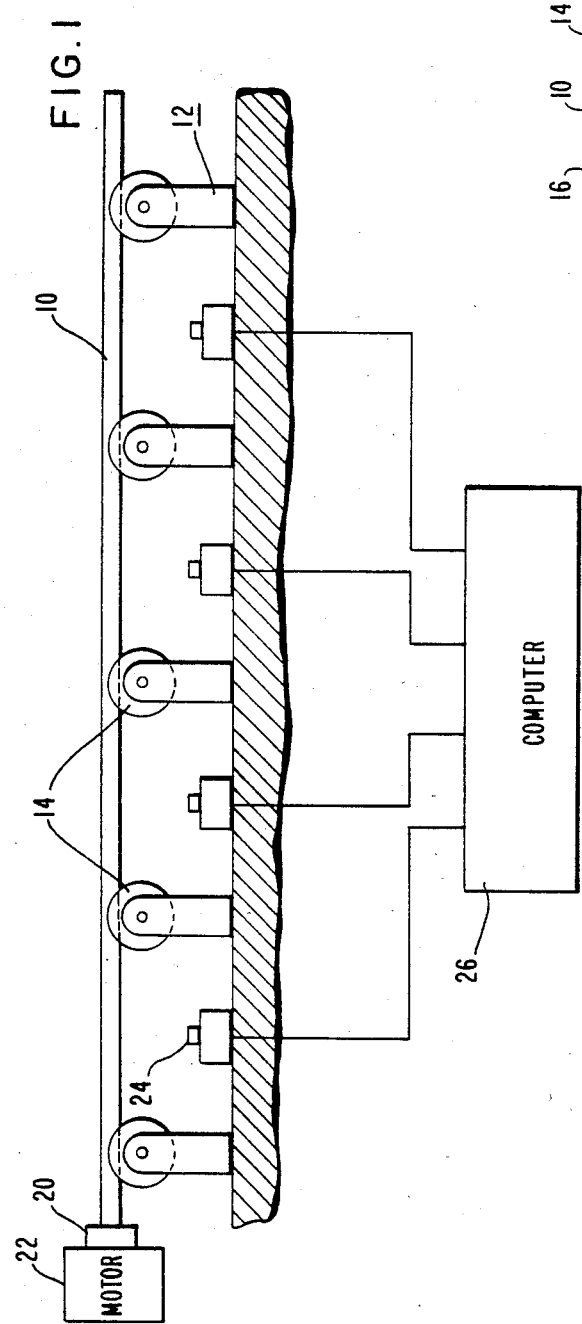
FIG. 1 is a front-elevational schematic view of the rod straightness measuring system including a nuclear fuel rod being tested.

The embodiment of the system of the invention, schematically shown in FIGS. 1 and 2, measures the straightness of any rod, including a flexible rod such as a nuclear fuel rod 10.

The system has means for supporting the rod 10 so that if the rod 10 were straight, it would remain straight without transverse translational movement while supported and remain straight without transverse translational movement while rotated about its longitudinal axis, and so that if the rod 10 were cambered, it would remain so cambered while supported and if rotated. A rod, especially a flexible rod, may be considered straight if, for example, it is straight while on a horizontal plane. The horizontal plane, of course, will prevent the rod from bending due to its own weight. Equivalently, a rod may be considered straight if it is straight while vertically hung from one end. By "straight" is meant straight to within pre-selected tolerances or uncertainties which are acceptably small compared to the predetermined accuracy requirements for a straightness measurement of the rod 10. As known to those skilled in the art, test equipment is built to an accuracy which depends upon the accuracy requirements in measuring the workpiece. The system also has means for rotating the supported rod 10 so that if the rod 10 were straight, it would be rotated about its longitudinal axis.

The support means could support the rod in any orientation. For vertical rod support, a rotatable clamp or chuck or the like on one or both rod ends could be used. For horizontal rod support, a rod may be supported by the above-mentioned clamp or the like on one or both rod ends, and/or supported between the rod ends by a surface table or by suspended or otherwise supported rings or yokes or the like acting like a support table. The necessity for, size of, and spacing apart of such rings or yokes depends upon the flexibility of the rod, with the requirement that a straight rod remain straight and without transverse translational motion while supported and rotated and with the requirement that a cambered rod would remain so cambered while supported and rotated. Such rings and yokes help prevent a rotating straight rod from transverse translational motion as does an added recessed or raised groove or the like in the surface table. However, for accurate straightness measurements, such rings, yokes and grooves must allow transverse translational motion of a rotating cambered rod due to its camber. For example, the size of a ring would be chosen based on the expected maximum rod camber, and the shape and low friction material of a groove would be chosen to allow a rotating cambered rod to transversely move within the groove to retain its camber. For rod orientation between vertical and horizontal, support for one or both rod ends and, if rod flexibility requires, support for its middle can be accomplished as previously discussed. The rotation means could employ a powered rotating chuck at one end of the rod or turn the rod between its ends by a belt drive type arrangement or the like.

Preferably such support means supports the rod 10 from underneath and supports the rod 10 so that if the rod were straight, it would be horizontal while supported. Of course, "horizontal" means horizontal to within required system measurement accuracy, as is known to those skilled in the art. Also, preferably such support means includes a multiplicity of support stations 12 which are rigidly-mounted and spaced apart from each other. It is desirable that the distances between neighboring support stations 12 are generally equal. Preferably the rod rotation means rotates the rod 10 from one of its two ends, and includes a chuck 20 rotated by a motor 22. With this arrangement of rod rotation, it is preferred that each support station 12 have a roller 14 with a circumferential groove 16. The nuclear fuel rod 10 is supported in the groove 16. The groove 16 also cradles the rod 10 when it is rotated to prevent transverse translational motion of a straight rod while allowing such motion for a cambered rod due to its camber. To this end, the roller 14, or at least its grooves 16, should be made from a low friction material. To automate the nuclear fuel rod inspection system, each support station 12 also has means for turning the roller 14 to move the supported fuel rod into and out from the chuck 20. Preferably such roller turning means includes the roller having a shaft 17 and includes a shaft driver 18 for turning the shaft 17. The shaft driver 18 could be a motor rotating the shaft directly or through a belt or chain drive or the like. Fuel rods 10 may be brought to and taken from the rollers 14 by conventional walking beams or other workpiece moving mechanisms (not shown).

The system additionally has a multiplicity of range finders 24 which are rigidly-mounted and which are spaced apart from each other. The range finders 24 are positioned apart from the nuclear fuel rod 10 and are directed towards the rod. The range finders 24 measure the distances to the rod 10 when the rod is rotating. The range finders 24 are positioned so that if the rod 10 were straight, each range finder 24 would be pointed perpendicular or transverse to the straight rod's longitudinal axis, and each range finder 24 would be disposed at a known distance from the straight rod. By "perpendicular" or "transverse" is meant perpendicular or transverse to within system measurement accuracy requirements. The known distance of one range finder need not be equal to the known distance of another range finder. Preferably, the range finders 24 are proximity sensors, known to those skilled in the art, although other types of range finders such as data loggers may be used depending on the accuracy and other requirements of the particular rod straightness measuring system. Preferably, the range finders 24 are placed underneath the fuel rod 10 and are positioned at generally equal distances from the supported and rotating fuel rod 10. It is desirable that one range finder 24 be positioned generally midway between neighboring support stations 12. Each range finder 12 will take numerous distance measurements as the fuel rod 10 rotates.

The system further has means for calculating for each of the range finders the differences in its distance measurements from the known distance of that range finder to a straight rod. These differences indicate the degree of straightness (or equivalently, the camber) of the fuel rod 10. Preferably, such difference calculating means includes a simple computer 26, such as a microprocessor or the like, receiving inputs from the range finders 24. The computer 26 could be programmed, as known by those skilled in the art, to compute differences and to generate a reject signal if the fuel rod 10 did not meet specifications (such as when any difference from any range finder exceeds some pre-chosen value). A rejected rod could be removed manually or by automation for salvage. The difference calculating means could also include conventional difference logic circuits or even merely be a visual display or printout of distance measurements for each range finder with manual comparison to its known distance to a straight rod.

In another embodiment of a system of the invention, otherwise identical with the one previously discussed, the calculating means, such as the computer 26, would be programmed to calculate for each of the range finders 24 the difference between the maximum and minimum of its distance measurements as an indication of rod straightness. For this case, it is not necessary that the distances from the range finders 24 to a straight rod be known.

The invention may also be described as a rod straightness measuring method which begins by supporting the rod (preferably a nuclear fuel rod 10) so that if the rod were straight, it would remain straight without transverse translational movement while supported and remain straight without transverse translational movement if rotated about its longitudinal axis, and so that if the rod were cambered, it would remain so cambered while supported and if rotated. The supported rod is rotated so that if the rod were straight, it would be rotated about its longitudinal axis. During the rotation, a multiplicity of range finders measure the distances between themselves and the rod. The range finders 24 are rigidly mounted and are spaced apart from each other. The range finders are placed apart from the rod, pointed towards the rod, and positioned so that if the rod were straight, each range finder 24 would be positioned perpendicular or transverse to the straight rod's longitudinal axis. (At this step in one option of the method, for each range finder the difference between its maximum and minimum measurements is calculated as an indication of the degree of straightness of the rod.) At this step, in a preferred option of the method, with the range finders positioned at known (but not necessarily equal) distances from a straight rod, the differences for each range finder between its distance measurements and its known distance from a straight rod are calculated, wherein these differences indicate the degree of straightness of the rod.

Preferably, the supporting step supports the rod from underneath and supports the rod so that a straight rod would be horizontally supported. Also, preferably the rotating step rotates the rod from one of its ends.

Typically, the nuclear fuel rod 10 is a zirconium tube 12 feet long and 0.4 inches in diameter which is inspected for straightness to a tolerance of 0.010 inches per foot. The rollers 14 are spaced 18 inches apart which is close enough to prevent rod sagging due to its own weight. The chuck 20 encloses about 4 feet of one end of the fuel rod 10. The fuel rod 10 is rotated at about 180 rpm. The range finders 24 are proximity sensors placed between 0.075 and 0.100 inches from a straight rod. Their time interval between measurements may be varied between about 1 and 650 milliseconds. The rod straightness inspection line employs a second rod straightness measuring system which includes a second chuck which encloses about 4 feet of the other end of the fuel rod. A walking beam transfers the rod between these two test areas. This allows a complete fuel rod to be tested without having to turn it around.

The chuck 20 prevents longitudinal translational motion of the rod during test. As can be appreciated by those skilled in the art, even if such motion were present during measurements, it would not effect the measurements of a straight rod and could be ignored for most applications. The calculated difference data, as is known to those skilled in the art, could be analyzed (even in the presence of known longitudinal translational motion) to give an exact three-dimensional straightness profile for a rod. However, in most instances, the rod straightness measuring system would be used to accept a rod as straight whose difference calculations did not exceed a pre-chosen value and to reject a rod as not straight whose difference calculations had any value which exceeded such pre-chosen value.

It will be apparent that many modifications and variations are possible in light of the above teachings. It, therefore, is to be understood that within the scope of the appended claims, the invention may be practiced other than as specifically described.

We claim:

1. A method for measuring the straightness of a rod, comprising the following steps:
    (a) supporting said rod so that if said rod were straight, said rod would remain straight without transverse translational movement while supported and if rotated about its longitudinal axis, and so that if said rod were cambered, said rod would remain so cambered while supported and if rotated;
    (b) rotating the supported said rod so that if said rod were straight, said rod would be rotated about its longitudinal axis;
    (c) measuring the distances during said rotation between the supported and rotating said rod and a plurality of rigidly-mounted, spaced-apart range finders, said range finders disposed apart from and directed towards the supported and rotating said rod and disposed so that if said rod were straight, said range finders would each be directed transverse to said longitudinal axis; and
    (d) calculating for each of said range finders the difference between the maximum and minimum of its said distance measurements, said differences indicating the degree of straightness of said rod.

2. A method for measuring the straightness of a rod, comprising the following steps:
    (a) supporting said rod so that if said rod were straight, said rod would remain straight without transverse translational movement while supported and rotated about its longitudinal axis, and so that if said rod were cambered, said rod would remain so cambered while supported and if rotated;
    (b) rotating the supported said rod so that if said rod were straight, said rod would be rotated about its longitudinal axis;
    (c) measuring the distances during said rotation between the supported and rotating said rod and a plurality of rigidly-mounted, spaced-apart range finders, said range finders disposed apart from and directed towards the supported and rotating said rod and disposed so that if said rod were straight, said range finders would each be directed transverse to said longitudinal axis and disposed at a known distance from said rod; and
    (d) calculating for each of said range finders the differences in its said distance measurements from its said known distance, said differences indicating the degree of straightness of said rod.

3. The method of claim 2, wherein:
    (a) said rod is a nuclear fuel rod;
    (b) said supporting step includes supporting said rod from underneath and supporting said rod so that if said rod were straight, said rod would be horizontal while supported; and
    (c) said rotating step includes rotating the supported said rod from one of its two ends.

4. A system for measuring the straightness of a rod, comprising:
    (a) means for supporting said rod so that if said rod were straight, said rod would remain straight without transverse translational movement while supported and if rotated about its longitudinal axis, and so that if said rod were cambered, said rod would remain so cambered while supported and if rotated;
    (b) means for rotating the supported said rod so that if said rod were straight, said rod would be rotated about its longitudinal axis;
    (c) a plurality of rigidly-mounted, spaced-apart range finders disposable apart from and directable towards the supported and rotating said rod for measuring the distances thereto during said rotation, and disposable so that if said rod were straight, said range finders would each be directed transverse to said longitudinal axis and disposed at a known distance from said rod; and (d) means for calculating for each of said range finders the differences in its said distance measurements from its said known distance, said differences indicating the degree of straightness of said rod.

5. The system of claim 4 wherein said rod is flexible.

6. The system of claim 5, wherein said rod is a nuclear fuel rod.

7. The system of claim 6, wherein said support means supports said rod from underneath and supports said rod so that if said rod were straight, said rod would be horizontal while supported.

8. The system of claim 7, wherein said rotation means rotates the supported said rod from one of its two ends.

9. The system of claim 8, wherein said rotation means includes a chuck and a motor for rotating said chuck.

10. The system of claim 9, wherein said support means includes a plurality of rigidly-mounted, spaced-apart support stations.

11. The system of claim 10, wherein said range finders include proximity sensors disposable underneath, and at generally equal distances from, the supported and rotating said rod, and wherein neighboring said support stations have one of said proximity sensors disposable generally midway in between.

12. The system of claim 11, wherein each of said support stations has a roller with a circumferential groove for supporting said fuel rod and for cradling the rotating said fuel rod, and each of said support stations has means for turning said roller to move the supported said fuel rod into and out from said chuck.

13. A system for measuring the straightness of a rod, comprising:

(a) means for supporting said rod so that if said rod were straight, said rod would remain straight without transverse translational movement while supported and if rotated about its longitudinal axis, and so that if said rod were cambered, said rod would remain so cambered while supported and if rotated;

(b) means for rotating the supported said rod so that if said rod were straight, said rod would be rotated about its longitudinal axis;

(c) a plurality of rigidly-mounted, spaced-apart range finders disposable apart from and directable towards the supported and rotating said rod for measuring the distances thereto during said rotation, and disposable so that if said rod were straight, said range finders would each be directed transverse to said longitudinal axis; and (d) means for calculating for each of said range finders the difference between the maximum and minimum of its said distance measurements, said differences indicating the degree of straightness of said rod.

* * * * *